United States Patent
Bilic et al.

(10) Patent No.: US 9,791,340 B2
(45) Date of Patent: Oct. 17, 2017

(54) SELF TEST FOR CAPACITIVE PRESSURE SENSORS

(71) Applicant: FREESCALE SEMICONDUCTOR, INC., Austin, TX (US)

(72) Inventors: Dubravka Bilic, Scottsdale, AZ (US); Chad S Dawson, Queen Creek, AZ (US)

(73) Assignee: NXP USA, Inc., Austin, TX (US)

( * ) Notice: Subject to any disclaimer, the term of this patent is extended or adjusted under 35 U.S.C. 154(b) by 96 days.

(21) Appl. No.: 14/805,948

(22) Filed: Jul. 22, 2015

(65) Prior Publication Data
US 2017/0023427 A1    Jan. 26, 2017

(51) Int. Cl.
*G01L 9/12*    (2006.01)
*G01L 9/00*    (2006.01)

(52) U.S. Cl.
CPC .......... *G01L 9/0072* (2013.01); *G01L 9/0042* (2013.01)

(58) Field of Classification Search
None
See application file for complete search history.

(56) References Cited

U.S. PATENT DOCUMENTS

| | | | |
|---|---|---|---|
| 5,431,057 | A | 7/1995 | Zimmer et al. |
| 7,926,353 | B2 | 4/2011 | Hammerschmidt |
| 2003/0015040 | A1 | 1/2003 | Ishio et al. |
| 2011/0146410 | A1 | 6/2011 | Hammerschmidt |
| 2014/0266263 | A1* | 9/2014 | Wurzinger ......... G01R 27/2605 324/686 |

FOREIGN PATENT DOCUMENTS

WO    WO89/10546 A1    11/1989

* cited by examiner

*Primary Examiner* — Andre Allen

(57) ABSTRACT

During a first cycle of operation, first and second bottom electrodes of a split bottom electrode are electrically connected together. A total capacitance between the split bottom electrode and a top electrode layer is measured to determine the ambient pressure. Accordingly, pressure, e.g., tire pressure, is measured during the first cycle of operation. In a second cycle of operation, the first and second bottom electrodes are electrically disconnected. A first capacitance between the first bottom electrode and top electrode layer and a second capacitance between second bottom electrode and top electrode layer are measured. The difference between the first capacitance and the second capacitance is calculated and compared to a fault indicating capacitance variation to determine if the pressure sensor device is operating normally or malfunctioning. Accordingly, a self-test of the pressure sensor device is performed during the second cycle of operation.

10 Claims, 6 Drawing Sheets

SELF TEST FOR CAPACITIVE PRESSURE SENSORS

FIELD

This disclosure relates generally to sensor devices, and more specifically, to capacitive pressure sensors and methods associated therewith.

BACKGROUND

Micro-Electro-Mechanical-System (MEMS) devices include MEMS pressure sensors. A MEMS pressure sensor measures pressure, e.g., by measuring movement of a pressure sensing diaphragm.

For example, a MEMS pressure sensor is used in a tire pressure monitoring system (TPMS) to monitor the pressure of a tire. However, should the MEMS pressure sensor fail or be damaged in some respect, an incorrect, e.g., high or low, tire pressure reading may be obtained even though the tire pressure is actually within a normal range. Accordingly, it is difficult to distinguish whether the tire pressure is out of range or whether the MEMS pressure sensor has failed.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
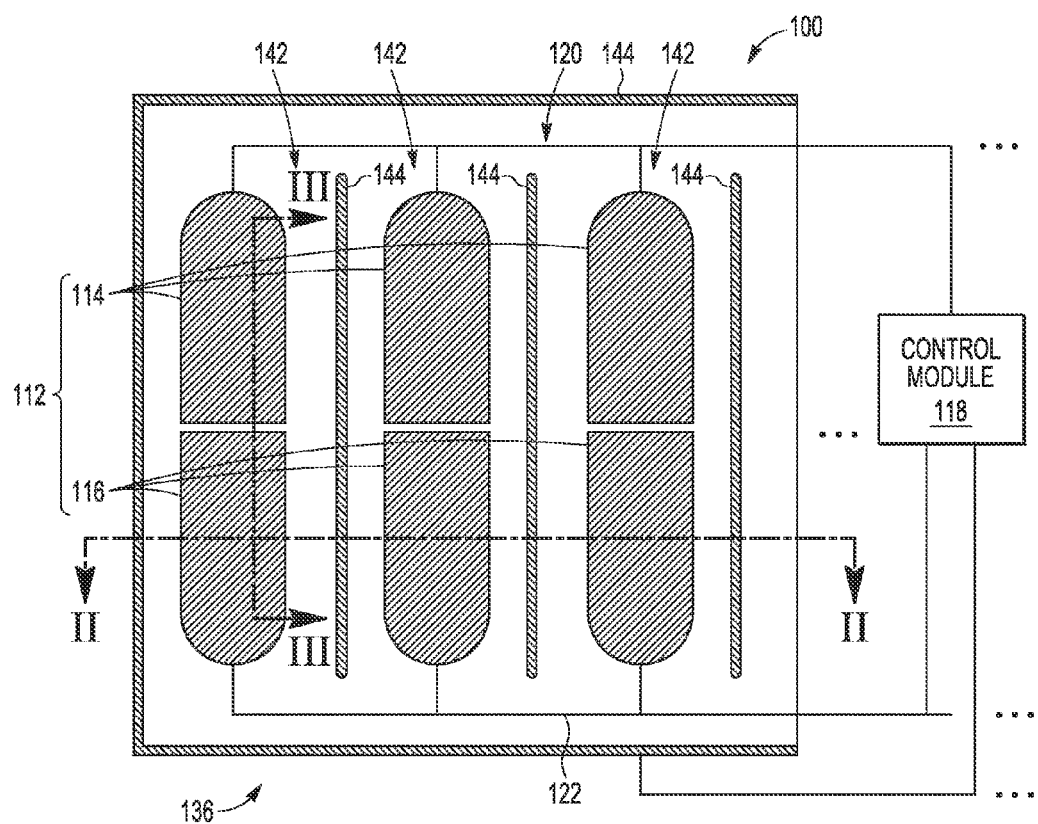
FIG. 1 is a top plan view of a self-testing capacitive pressure sensor device in accordance with one embodiment.
Figure 3:
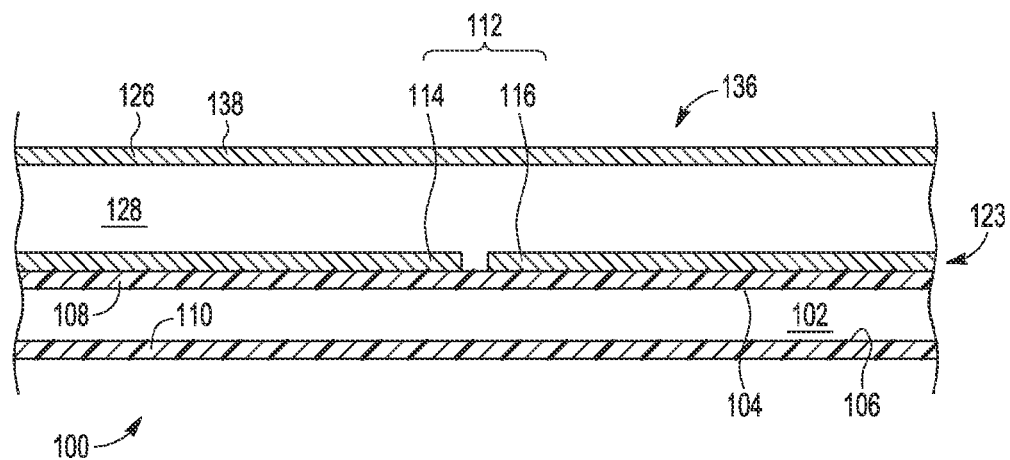
FIG. 3 is a cross-sectional view of the self-testing capacitive pressure sensor device along the line III-III of FIG. 1 in accordance with one embodiment.

As an overview and in accordance with one embodiment, referring to FIGS. 1 and 3 together, a pressure sensor device 100 includes a split bottom electrode 112 having a first bottom electrode 114 and a second bottom electrode 116. During a first cycle of operation, bottom electrodes 114, 116 are electrically connected together. A total capacitance between split bottom electrode 112 and a top electrode layer 126 is measured to determine the ambient pressure. Accordingly, pressure, e.g., tire pressure, is measured during the first cycle of operation.

In a second cycle of operation, bottom electrodes 114, 116 are electrically disconnected. A first capacitance between bottom electrode 114 and top electrode layer 126 and a second capacitance between bottom electrode 116 and top electrode layer 126 are measured. The difference between the first capacitance and the second capacitance is calculated and compared to a predetermined fault indicating capacitance variation to determine if pressure sensor device 100 is operating normally or malfunctioning. Accordingly, a self-test of pressure sensor device 100 is performed during the second cycle of operation.

In this manner, it is readily determined whether the tire pressure is out of range or whether pressure sensor device 100 has failed.

Figure 2:
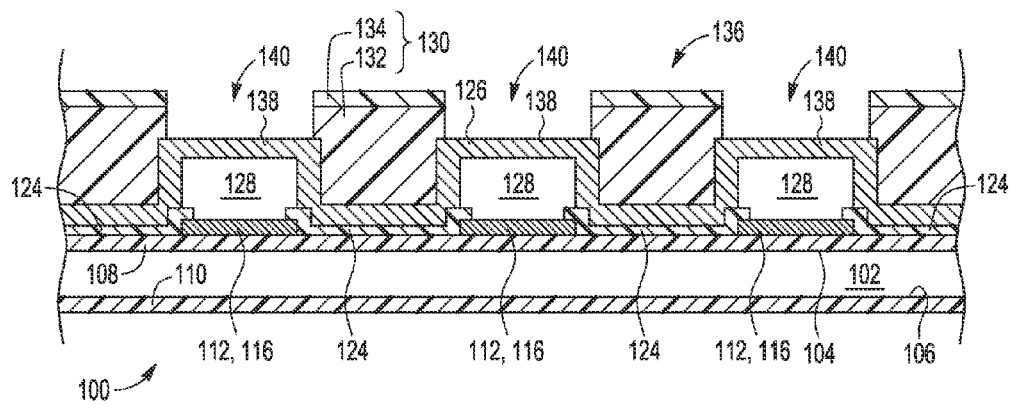
FIG. 2 is a cross-sectional view of the self-testing capacitive pressure sensor device along the line II-II of FIG. 1 in accordance with one embodiment.

Now in more detail, FIG. 1 is a top plan view of a self-testing capacitive pressure sensor device 100 in accordance with one embodiment. FIG. 2 is a cross-sectional view of self-testing capacitive pressure sensor device 100 along the line II-II of FIG. 1 in accordance with one embodiment. FIG. 3 is a cross-sectional view of self-testing capacitive pressure sensor device 100 along the line III-III of FIG. 1 in accordance with one embodiment. FIG. 1 is a partial view illustrating a split bottom electrode 112 and the features above split bottom electrode 112 are not illustrated in FIG. 1 for purposes of clarity but are shown in FIGS. 2 and 3.

Referring now to FIGS. 1, 2 and 3 together, self-testing capacitive pressure sensor device 100 includes a substrate 102 having an upper, e.g., first, surface 104 and a lower, e.g., second, surface 106 opposite upper surface 104. Substrate 102 is formed of a semiconductor material including monocrystalline (single crystal) silicon although is formed of other materials in other embodiments.

Located on upper surface 104 is an upper, e.g., first, insulation layer 108. Located on lower surface 106 is a lower, e.g., second, insulation layer 110. In one embodiment, insulation layers 108, and/or 110 are formed of silicon oxide although are formed of other dielectric materials in other embodiments.

Located on upper insulation layer 108 is electrically conductive split bottom electrode 112. Split bottom electrode 112 includes two discrete bottom electrodes 114, 116, sometimes called first and second bottom electrodes 114, 116, that are directly adjacent but electrically isolated from one another. Bottom electrodes 114, 116 are electrically connected to a control module 118 by bottom electrode traces 120, 122, respectively. In one embodiment, bottom electrodes 114, 116 and bottom electrode traces 120, 122 are parts of a common conductive layer 123, e.g., electrically conductive polysilicon. Although split bottom electrode 112 is split in the middle in accordance with this embodiment, in other embodiments, split bottom electrode 112 is split in other ways, e.g., lengthwise, diagonally, or otherwise.

Also located on upper insulation layer 108 adjacent split bottom electrode 112 is a passivation layer 124, e.g., of silicon rich nitride (SiRN) although is formed of other dielectric materials in other embodiments. In accordance with this embodiment, passivation layer 124 slightly overlaps the edges of split bottom electrode 112 and leaves the bulk of the center of split bottom electrode 112 exposed. However, in another embodiment, passivation layer 124 is spaced apart from split bottom electrode 112.

Located on passivation layer 124 is a top electrode layer 126. Top electrode layer 126 is spaced apart from split bottom electrode 112 in a first, e.g., vertical, direction. As used herein, the first direction is a direction perpendicular to upper surface 104 and a second direction is a direction perpendicular to the first direction and parallel to upper surface 104.

As top electrode layer 126 is spaced apart from split bottom electrode 112, a sealed cavity 128 is formed between top electrode layer 126 and split bottom electrode 112. Top electrode layer 126 is electrically connected to control module 118.

Located on top electrode layer 126 is a capping layer 130. Capping layer 130 seals, sometimes called caps, cavity 128 thus isolating cavity 128 from the ambient environment. In accordance with this embodiment, capping layer 130 is a bilayer structure including a first dielectric layer 132, e.g., a silicon oxide layer formed from Tetraethyl orthosilicate (TEOS), and a second dielectric layer 134, e.g., formed of silicon oxynityride (SiON).

Generally, split bottom electrode 112 and top electrode layer 126 define a Micro-Electro-Mechanical-System (MEMS) pressure sensor 136. MEMS pressure sensor 136 measures the ambient pressure as well as self-tests to detect whether MEMS pressure sensor 136 is malfunctioning as discussed below.

More particularly, extending through capping layer 130 to expose a pressure sensing diaphragm portion 138 of top electrode layer 126 is a pressure sensor port 140. Pressure sensor port 140 is aligned with and overlaps top electrode layer 126 above split bottom electrode 112. Pressure sensing diaphragm portion 138 forms the pressure sensing diaphragm of MEMS pressure sensor 136 in accordance with this embodiment.

In accordance with the embodiment illustrated in FIGS. 1-3, MEMS pressure sensor 136 is a multi-cell pressure sensor having a plurality of distinct pressure sensor cells 142. Pressure sensor cells 142 are separated from one another by anchors 144. Anchors 144 are defined as the regions where top electrode layer 126 is in direct contact with passivation layer 124.

Cavity 128 of pressure sensor cells 142 is a common shared cavity. By forming a plurality of pressure sensor cells 142, the area of pressure sensing diaphragm portion 138 of top electrode layer 126 is increased as compared to a single pressure sensor cell 142. This increases the change of capacitance between pressure sensing diaphragm portion 138 and split bottom electrode 112 as the ambient pressure changes. This insures that MEMS pressure sensor 136 has adequate sensitivity to pressure. Further, by forming a plurality of pressure sensor cells 142, pressure sensing diaphragm portion 138 is formed of a plurality of supported portions of top electrode layer 126 in contrast to a single large area.

In one embodiment, MEMS pressure sensor 136 is formed with a plurality, e.g., two or more, of pressure sensor cell 142. However, in another embodiment, MEMS pressure sensor 136 is formed with only a single pressure sensor cell 142. Although the operation of a single pressure sensor cell 142 is discussed in detail, in light of this disclosure, those of skill in the art will understand that the discussion is applicable to the plurality of pressure sensor cells 142.

Figure 4:
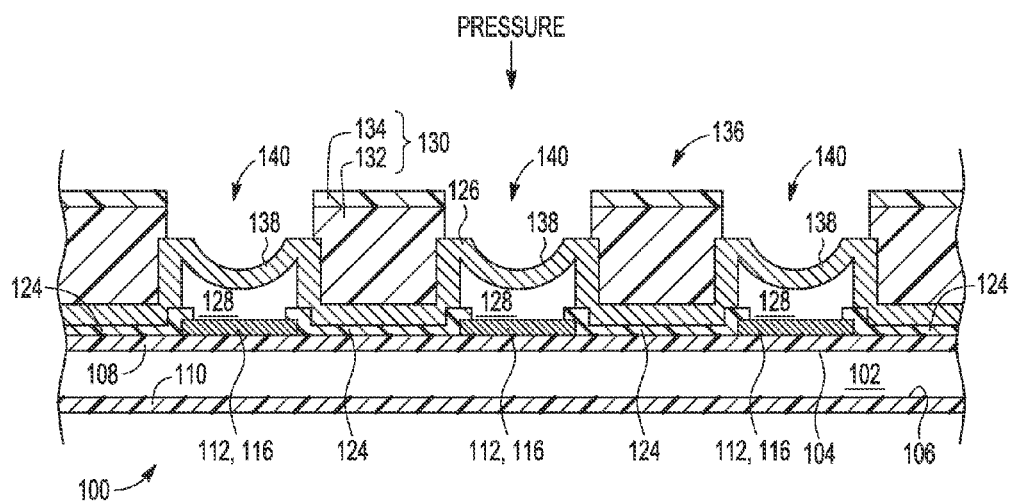
FIG. 4 is a cross-sectional view of the self-testing capacitive pressure sensor device along the line II-II of FIG. 1 during operation in accordance with one embodiment.
Figure 5:
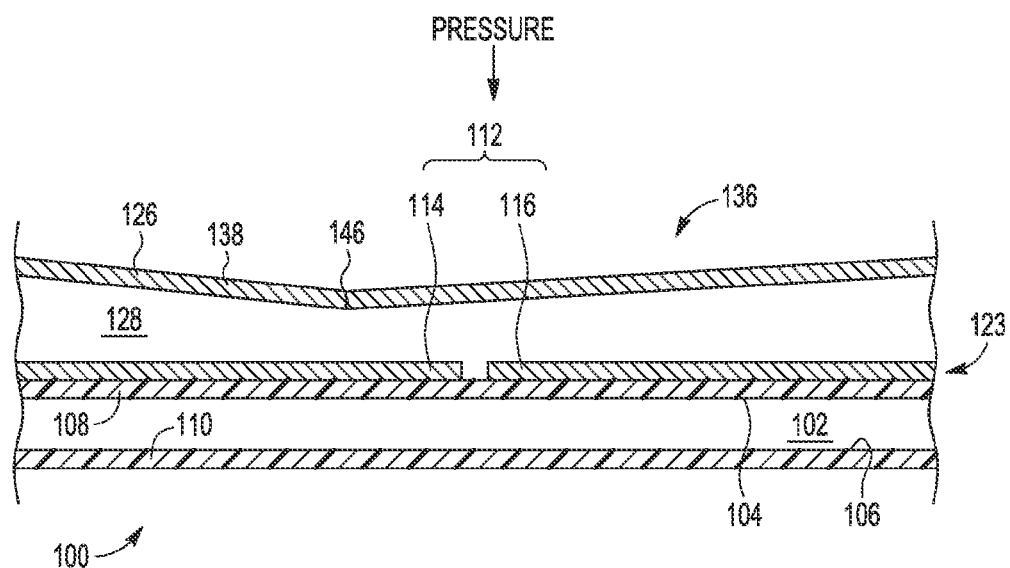
FIG. 5 is a cross-sectional view of the self-testing capacitive pressure sensor device along the line III-III of FIG. 1 during operation in accordance with one embodiment.

FIG. 4 is a cross-sectional view of self-testing capacitive pressure sensor device 100 along the line II-II of FIG. 1 during operation in accordance with one embodiment. FIG. 5 is a cross-sectional view of self-testing capacitive pressure sensor device 100 along the line III-III of FIG. 1 during operation in accordance with one embodiment. FIGS. 4 and 5 correspond to the view of FIGS. 2 and 3 except that pressure sensor diagram portion 138 of top electrode layer 126 has been displaced towards split bottom electrode 112 due to application of pressure to pressure sensor diagram portion 138.

More particularly, during operation, changes in pressure in the ambient environment move pressure sensing diaphragm portion 138. Movement of pressure sensing diaphragm portion 138 changes the distance between pressure sensing diaphragm portion 138 and split bottom electrode 112, e.g., increases or decreases the distance. As the distance between pressure sensing diaphragm portion 138 and split bottom electrode 112 changes, the capacitance between movable pressure sensing diaphragm portion 138 and split bottom electrode 112 changes. This change in capacitance is measured to measure the ambient pressure within pressure sensor port 140.

However, pressure sensing diaphragm portion 138 can become nonoperational, e.g., inadvertently damaged, destroyed, or contaminated. For example, as shown in FIG. 5, a crack 146 can form in pressure sensing diaphragm portion 138. By forming pressure sensor device 100 with split bottom electrode 112, the nonoperation of pressure sensing diaphragm portion 138 is readily detected as set forth in self-test method 600 of FIG. 6.

Figure 6:
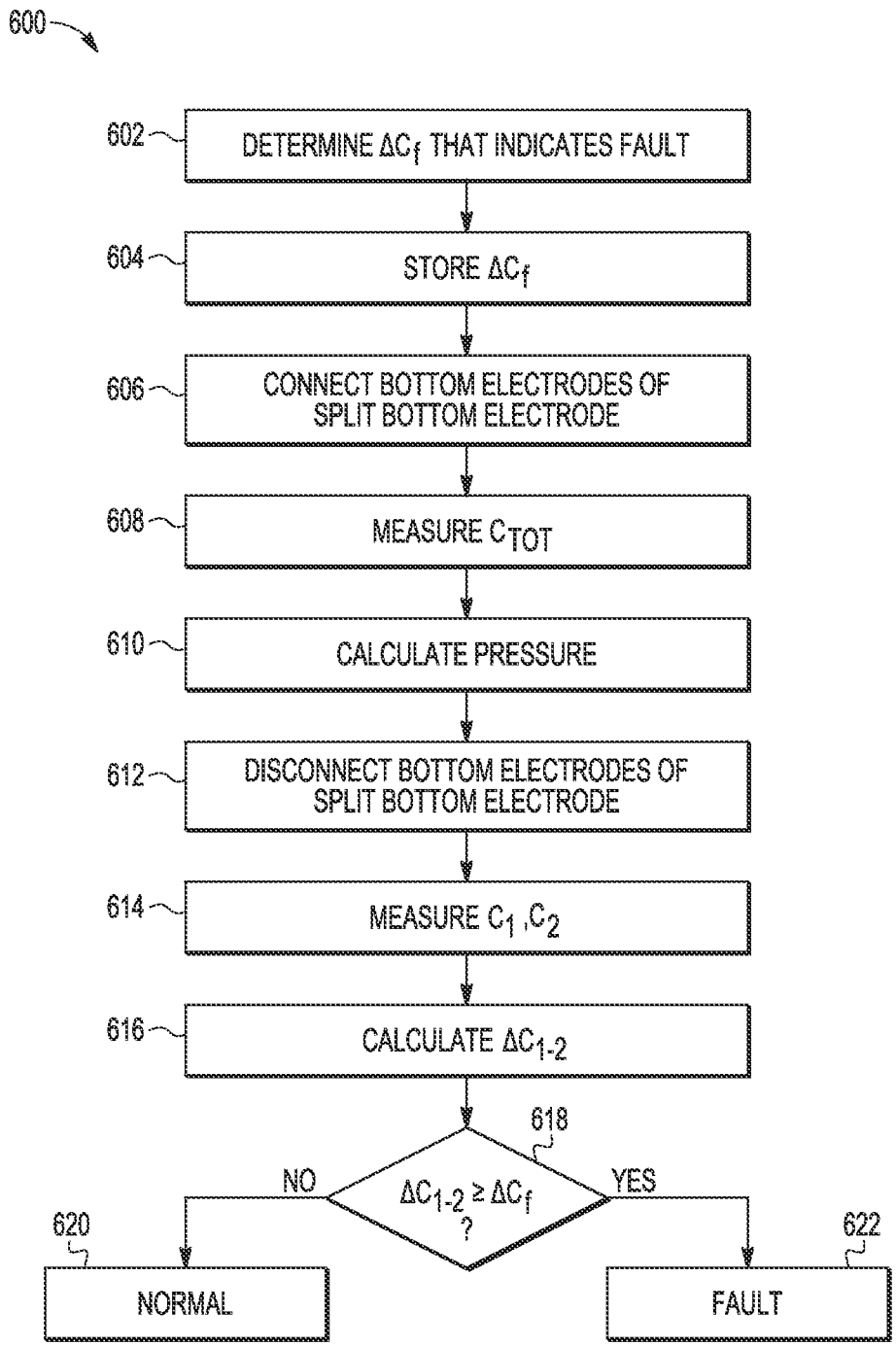
FIG. 6 is a block diagram of a self-test method of self-testing the pressure sensor device of FIGS. 1-5 in accordance with one embodiment.

FIG. 6 is a block diagram of a self-test method 600 of self-testing pressure sensor device 100 of FIGS. 1-5 in accordance with one embodiment. In one embodiment, control module 118 includes a processor, sometimes called a microcontroller, and a memory, and execution of one or more instructions within the memory by the processor results in the operations of self-test method 600.

Referring now to FIGS. 1 and 6 together, to determine a fault in the sensor, a change in capacitance between the split electrodes and the deformable membrane ($\Delta Cf$) is used. The fault indicating capacitance variation $\Delta Cf$ is the maximum allowable variation in a first capacitance C1 between bottom electrode 114 and top electrode layer 126 and a second capacitance C2 between bottom electrode 116 and top electrode layer 126. In embodiments, $\Delta Cf$ can be determined experimentally or otherwise estimated (602). For example, the difference between the first capacitance C1 and the second capacitance C2 during normal operation is measured, and the fault indicating capacitance variation $\Delta Cf$ is set as a value greater than the difference observed during normal operation. In one embodiment, if pressure sensor device 100 is made in an integrated process with some circuitry, capacitances C1, C2 are measured during probe testing and stored in the registers for future reference (e.g. during use in the field).

From determine $\Delta Cf$ that indicates fault operation 602, flow moves to a store $\Delta Cf$ operation 604. In store $\Delta Cf$ operation 604, the fault indicating capacitance variation $\Delta Cf$ is stored. For example, the fault indicating capacitance variation $\Delta Cf$ is stored on a microcontroller of control module 118 during the pressure sensor trim, and subsequently used during the pressure sensor operation for comparison and tracking during pressure sensor operation as discussed further below. In one embodiment, operations 602, 604 are performed once, e.g., during testing or initial setup. The other operations are performed during operation, e.g., in the field.

From store $\Delta Cf$ operation 604, flow moves to a connect bottom electrodes of split bottom electrode operation 606. In connect bottom electrodes of split bottom electrode operation 606, bottom electrodes 114, 116 of split bottom electrode 112 are electrically connected together, e.g., by control module 118. Accordingly, bottom electrodes 114, 116 operate as a single electrically continuous bottom electrode for pressure sensor measurement.

From connect bottom electrodes of split bottom electrode operation 606, flow moves to a measure $C_{TOT}$ operation 608. In measure $C_{TOT}$ operation 608, the total capacitance $C_{TOT}$ between split bottom electrode 112 and top electrode layer 126 is measured.

From measure $C_{TOT}$ operation 608, flow moves to a calculate pressure operation 610. In calculate pressure operation 610, the ambient pressure is calculated using the total capacitance $C_{TOT}$ measured in measure $C_{TOT}$ operation 608. In one embodiment, a reference pressure cell is used to compensate for local variables, e.g., temperature, during calculation of the ambient pressure. In this manner, pressure sensor device 100 measures pressure in a first cycle of operation.

From calculate pressure operation 610, flow moves to a disconnect bottom electrodes of split bottom electrode operation 612. In disconnect bottom electrodes of split bottom electrode operation 612, bottom electrodes 114, 116 of split bottom electrode 112 are disconnected, i.e., are electrically isolated from one another. For example, control module 118 disconnects bottom electrodes 114, 116. Accordingly, bottom electrodes 114, 116 operate as two electrically isolated bottom electrodes for self-testing of pressure sensor device 100 in a second cycle of operation.

From disconnect bottom electrodes of split bottom electrode operation 612, flow moves to a measure C1, C2 operation 614. In measure C1, C2 operation 614, a first capacitance C1 between bottom electrode 114 and top electrode layer 126 and a second capacitance C2 between bottom electrode 116 and top electrode layer 126 are measured.

From measure C1, C2 operation 614, flow moves to a calculate $\Delta C_{1-2}$ operation 616. In calculate $\Delta C_{1-2}$ operation 616, the difference $\Delta C_{1-2}$ between the first capacitance C1 and the second capacitance C2 measured in measure C1, C2 operation 614 is calculated.

From calculate $\Delta C_{1-2}$ operation 616, flow moves to a $\Delta C_{1-2}$ is greater than or equal to $\Delta Cf$ check operation 618. In $\Delta C_{1-2}$ is greater than or equal to $\Delta Cf$ check operation 618, a determination is made as to whether the difference $\Delta C_{1-2}$ between the first capacitance C1 and the second capacitance C2 calculated in calculate $\Delta C_{1-2}$ operation 616 is greater than or equal to the fault indicating capacitance variation $\Delta Cf$ stored in store $\Delta Cf$ operation 604.

Upon a determination that the difference $\Delta C_{1-2}$ between the first capacitance C1 and the second capacitance C2 is less than the fault indicating capacitance variation $\Delta Cf$, flow moves from $\Delta C_{1-2}$ is greater than or equal to $\Delta Cf$ check operation 618 to a normal operation 620. In normal operation 620, a determination is made that pressure sensor device 100 is operating normally. More particularly, since the difference $\Delta C_{1-2}$ between the first capacitance C1 and the second capacitance C2 is less than the fault indicating capacitance variation $\Delta Cf$, pressure sensor device 100 is operating within a normal range and thus the pressure calculated within calculate pressure operation 610 is valid. Ideally, the first capacitance C1 and the second capacitance C2 should be the same but as long as the difference $\Delta C_{1-2}$ between capacitances C1, C2 is less than the fault indicating capacitance variation $\Delta Cf$, pressure sensor device 100 is operating within a normal range.

However, upon a determination that the difference $\Delta C_{1-2}$ between the first capacitance C1 and the second capacitance C2 is greater than or equal to the fault indicating capacitance variation $\Delta Cf$, flow moves from $\Delta C_{1-2}$ is greater than or equal to $\Delta Cf$ check operation 618 to a fault operation 622. In fault operation 622, a determination is made that pressure sensor device 100 is faulty, i.e., is not operating normally. More particularly, since the difference $\Delta C_{1-2}$ between the first capacitance C1 and the second capacitance C2 is greater than the fault indicating capacitance variation $\Delta Cf$, pressure sensor device 100 is operating outside a normal range and thus the pressure calculated within calculate pressure operation 610 is presumed invalid.

For example, referring to FIG. 5, in one embodiment, pressure sensor diaphragm portion 138 of top electrode layer 126 is damaged as indicated by the crack 146. Due to the crack 146, the deflection of pressure sensor diaphragm portion 138 is not uniform above bottom electrodes 114, 116, i.e., there will be more or less deflection over bottom electrode 114 than over bottom electrode 116. For example, due to the crack 146, the spring constant of pressure sensor diaphragm portion 138 above bottom electrode 114 is different than the spring constant of pressure sensor diaphragm portion 138 above bottom electrode 116.

Accordingly, the first capacitance C1 between bottom electrode 114 and top electrode layer 126 will vary as compared to the second capacitance C2 between bottom electrode 116 and top electrode layer 126. As this variation exceeds the normal variation during normal operation, a determination is made in fault operation 622 that pressure sensor device 100 is malfunctioning. Accordingly, an indication that pressure sensor device 100 is malfunctioning is generated in fault operation 622. For example, a signal indicating that pressure sensor device 100 is malfunctioning is generated from control module 118.

Although crack 146 is set forth as causing the malfunction, in other embodiments, other damage or debris on pressure sensor diaphragm portion 138 will cause pressure sensor device 100 to malfunction.

Accordingly, in a second cycle of operation as set forth in operations 612, 614, 616, 618, 620, 622, a self-test to determine if pressure sensor device 100 is malfunctioning or operating normally is performed. Accordingly, using method 600, it is readily determined whether pressure sensor device 100 has failed versus whether a car's tire is under or over inflated.

Although a particular order of operations is set forth in FIG. 6, in other embodiments, the operations are performed in a different order and/or only a set of the operations is performed. For example, operations 612, 614, 616, 618 are performed and if a determination is made that the pressure sensor device 100 is malfunctioning in fault operation 622, no further pressure sensor measurements are made, e.g., operations 606, 608, 610 are not performed. As another example, operations 612, 614, 616, 618 are performed and if a determination is made that the pressure sensor device 100 is operating normally in normal operation 620, then pressure sensor measurements are made, e.g., operations 606, 608, 610 are performed.

Figure 7:
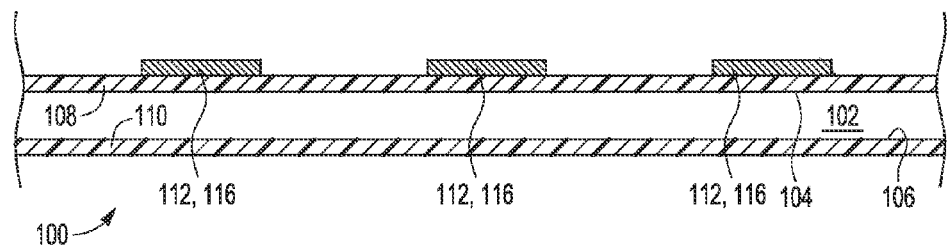
FIG. 7 is a cross-sectional view of the self-testing capacitive pressure sensor device along the line II-II of FIG. 1 during fabrication in accordance with one embodiment.

In accordance with one embodiment, a method of fabricating self-testing capacitive pressure sensor device 100 is also presented. FIG. 7 is a cross-sectional view of self-testing capacitive pressure sensor device 100 along the line II-II of FIG. 1 during fabrication in accordance with one embodiment. Referring to FIG. 7, to fabricate self-testing capacitive pressure sensor device 100, a substrate 102, e.g., a silicon wafer having a thickness of 625 µm, is oxidized to form upper and lower insulating layers 108, 110. Illustratively, upper and lower insulating layers 108, 110 are 2.5 µm silicon oxide layers formed by oxidizing substrate 102.

An electrically conductive layer, e.g., 0.35 μm thick electrically conductive polysilicon, is deposited and patterned to form split bottom electrode 112 including bottom electrodes 114, 116 and bottom electrode traces 120, 122.

Figure 8:
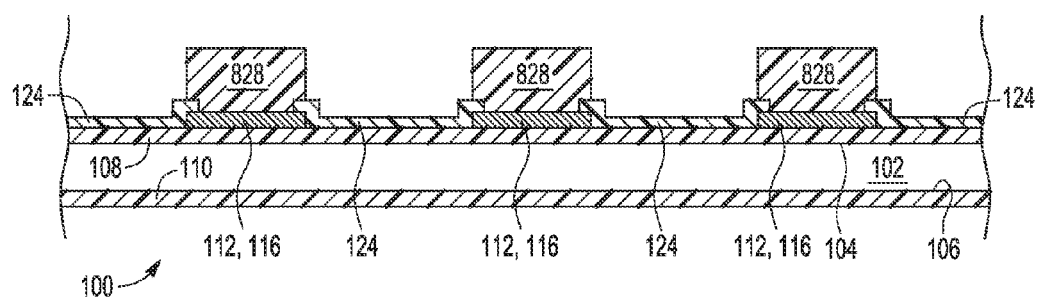
FIGS. 8, 9, and 10 are cross-sectional views of the self-testing capacitive pressure sensor device of FIG. 7 at later stages during fabrication in accordance with one embodiment.

FIG. 8 is a cross-sectional view of self-testing capacitive pressure sensor device 100 of FIG. 7 at a later stage during fabrication in accordance with one embodiment. Referring now to FIG. 8, a passivation layer, e.g., 0.5 μm silicon rich nitride (SiRN) layer, is blanket deposited and patterned to form passivation layer 124 exposing bottom electrodes 114, 116. In the region corresponding to cavity 128 to be later formed, a phosphosilicate glass (PSG) sacrificial layer 828 is formed.

Figure 9:
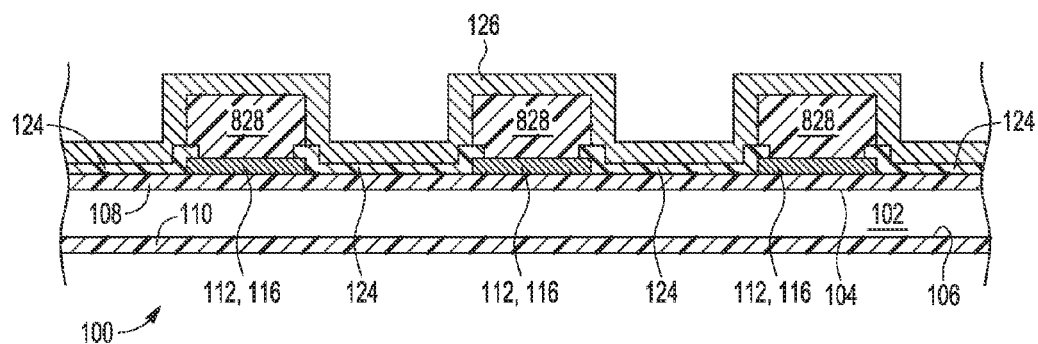

FIG. 9 is a cross-sectional view of self-testing capacitive pressure sensor device 100 of FIG. 8 at a later stage during fabrication in accordance with one embodiment. Referring now to FIG. 9, top electrode layer 126, e.g., 2.0 μm electrically conductive polysilicon, is formed on PSG sacrificial layer 828 and the exposed passivation layer 124.

Top electrode layer 126 has openings therein (not shown) extending to PSG sacrificial layer 828.

Figure 10:
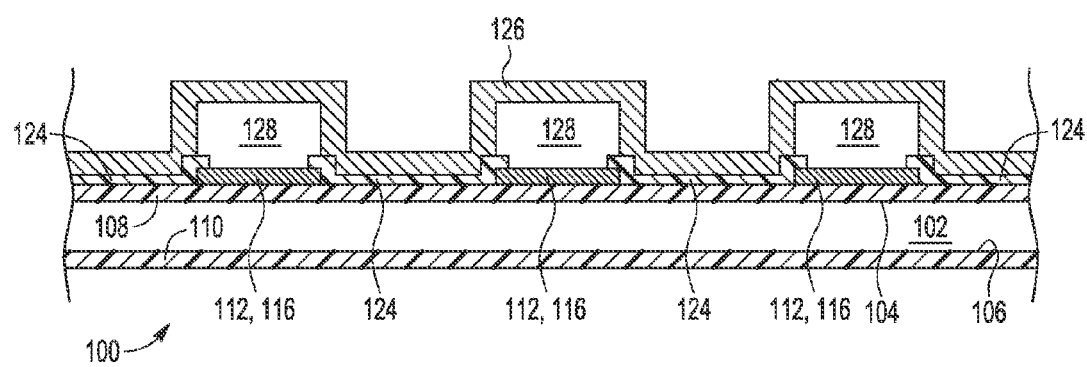

FIG. 10 is a cross-sectional view of self-testing capacitive pressure sensor device 100 of FIG. 9 at a later stage during fabrication in accordance with one embodiment. Referring now to FIGS. 9 and 10 together, PSG sacrificial layer 828 (FIG. 9) is removed through the openings thus forming cavity 128 (FIG. 10).

FIG. 2 is a cross-sectional view of self-testing capacitive pressure sensor device 100 of FIG. 10 at a further stage during fabrication in accordance with one embodiment. Referring now to FIGS. 2, 9, and 10 together, capping layer 130 is formed to seal the holes within top electrode layer 126 through which PSG sacrificial layer 828 was etched and removed. Capping layer 130 thus hermetically seals cavity 128. Illustratively, capping layer 130 includes first dielectric layer 132, e.g., a 2.33 μm silicon oxide layer formed from Tetraethyl orthosilicate (TEOS), and second dielectric layer 134, e.g., a 0.77 μm silicon oxynityride (SiON) layer.

Although the invention is described herein with references to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
measuring a first capacitance between a first bottom electrode and a top electrode layer of a pressure sensor device;
measuring a second capacitance between a second bottom electrode and the top electrode layer, wherein the second bottom electrode is distinct from the first bottom electrode;
calculating a difference between the first capacitance and the second capacitance; and
determining whether the difference between the first capacitance and the second capacitance is greater than or equal to a fault indicating capacitance variation.

2. The method of claim 1 wherein in response to a determination that the difference between the first capacitance and the second capacitance is less than the fault indicating capacitance variation, determining that the pressure sensor device is operating normally.

3. The method of claim 1 wherein in response to a determination that the difference between the first capacitance and the second capacitance is greater than or equal to the fault indicating capacitance variation, determining that the pressure sensor device is malfunctioning.

4. The method of claim 3 wherein in response to a determination that the pressure sensor device is malfunctioning, generating a signal indicating that the pressure sensor device is malfunctioning.

5. The method of claim 1 further comprising:
measuring a total capacitance between the split bottom electrode and the top electrode layer; and
calculating an ambient pressure using the total capacitance.

6. The method of claim 5 further comprising electrically coupling the first bottom electrode and the second bottom electrode.

7. The method of claim 6 wherein the electrically coupling precedes the measuring a total capacitance.

8. The method of claim 1 further comprising electrically decoupling the first bottom electrode and the second bottom electrode.

9. The method of claim 8 wherein the electrically decoupling precedes the measuring a first capacitance and the measuring a second capacitance.

10. The method of claim 1 further comprising:
determining the fault indicating capacitance variation; and
storing the fault indicating capacitance variation.

* * * * *